United States Patent [19]

Hood

[11] 4,095,705
[45] Jun. 20, 1978

[54] AGRICULTURAL AIRPLANE LOADING DEVICE

[76] Inventor: Clifton E. Hood, P.O. Box 412, Blytheville, Ark. 72315

[21] Appl. No.: 764,956

[22] Filed: Feb. 2, 1977

[51] Int. Cl.$^2$ ............................................. B60P 1/40
[52] U.S. Cl. ................................ 214/83.18; 198/532; 198/674; 214/83.32; 222/196
[58] Field of Search ............... 214/17 D, 83.18, 83.2, 214/83.32; 198/311, 532, 533, 548, 558, 631, 671, 674; 222/196, 201

[56] References Cited

U.S. PATENT DOCUMENTS

| | | | |
|---|---|---|---|
| 2,507,873 | 5/1950 | Ward | 198/532 X |
| 3,411,757 | 11/1968 | Hale | 214/83.32 X |
| 3,454,170 | 7/1969 | Kleissle | 214/41 X |
| 3,552,346 | 1/1971 | Garden | 214/83.3 X |
| 3,563,523 | 2/1971 | Wendt | 222/196 X |

*Primary Examiner*—Robert G. Sheridan
*Attorney, Agent, or Firm*—Clarence A. O'Brien; Harvey B. Jacobson

[57] ABSTRACT

An agricultural airplane loading device having a wheeled frame on which is mounted a hopper provided with a lower portion forming a discharge opening. Arranged below the hopper for receiving material from the discharge opening of the hopper is an auger conveyor which elevates the material received from the hopper at an angle permitting the material to be discharged into a reservoir of an airplane without contacting the aircraft. A gate arrangement controls flow of material from the hopper to the conveyor, while a pulley affixed to the auger for rotating same is provided with a mass disposed eccentrically of the auger for vibrating the hopper when the conveyor is in operation and preventing bridging and tunnelling of material in the hopper.

1 Claim, 5 Drawing Figures

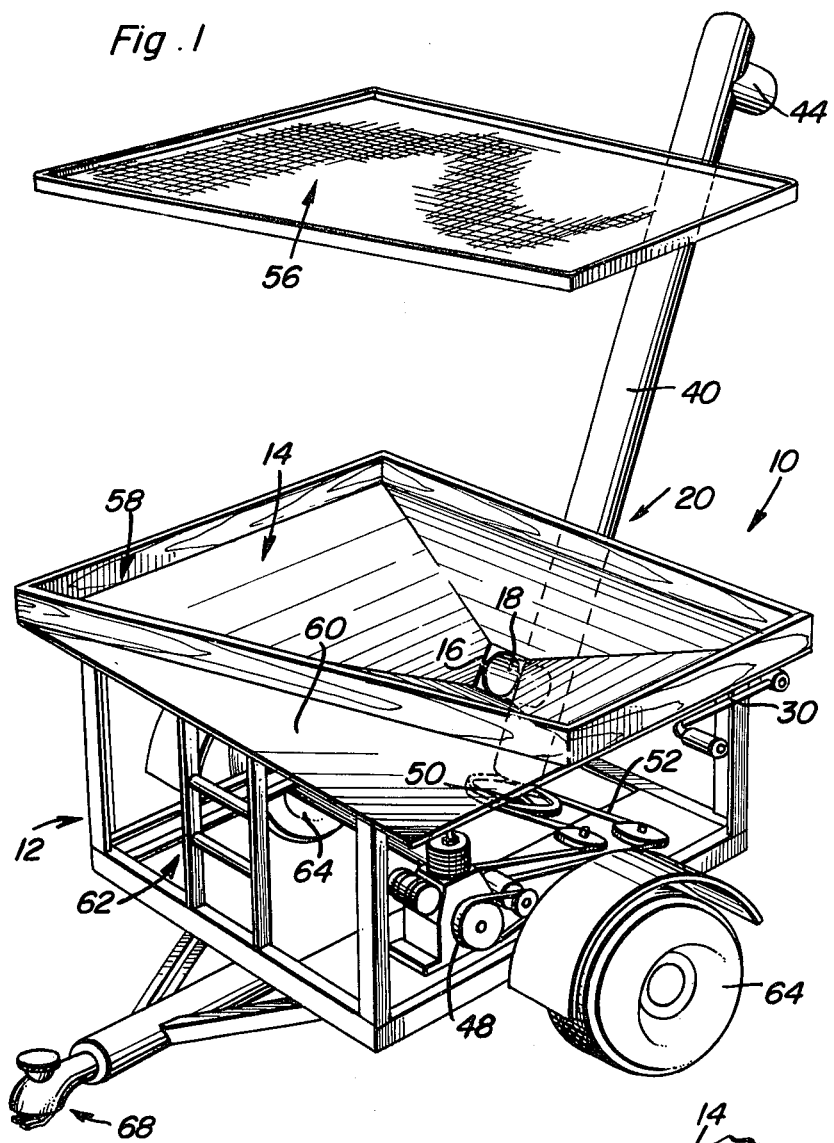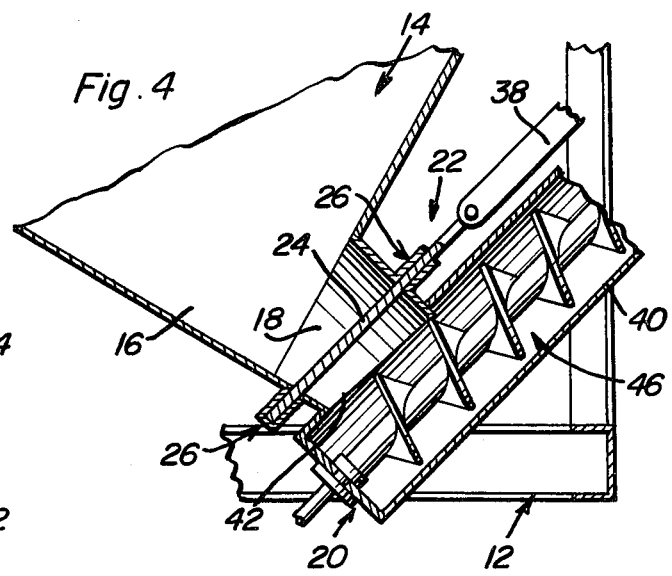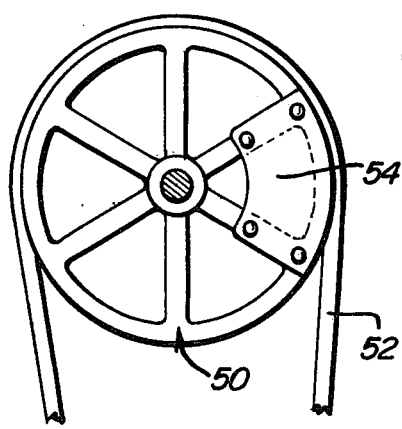

AGRICULTURAL AIRPLANE LOADING DEVICE

BACKGROUND OF THE INVENTION

1. Field of the Invention

This invention relates generally to loading devices for dry and similar materials, and particularly to a loading device intended for use with agricultural airplanes whereby the aircraft can be loaded with prilled fertilizer, seed and the like, without endangering the aircraft during the loading operation.

2. Description of the Prior Art

Difficulties are encountered during the loading of agricultural airplanes with prilled fertilizer or seed to be dispensed from the aircraft in that the tanks or reservoirs of the airplane are generally some distance above the surface supporting the aircraft, and that the airplanes are generally at small private airfields scattered about a given area being serviced by a single firm. Thus, the aircraft are frequently damaged during the loading operation, while the operators actually loading the aircraft have problems moving the chemicals to be loaded from one site to another, with the hours during which such loading must take place occasionally requiring the transport of the chemicals to be made during the nighttime hours.

U.S. Pat. No. 3,334,760, issued Aug. 8, 1967, to Bolinger, et al., discloses a material spreading vehicle including a hopper mounted on a wheeled frame and having in its bottom a gate arrangement which permits selective communication of the contents of the hopper with a discharge conveyor. Further, U.S. Pat. No. 3,411,757, issued Nov. 19, 1968, to Hale, discloses a loader wherein a screen is placed over the entrance to the hopper of the loader, while U.S. Pat. No. 2,405,727, issued Aug. 13, 1946, to Aaberg, discloses a grain carrier including a hopper and screw conveyor combination wherein a screen is placed over the entrance to the conveyor from the hopper.

U.S. Pat. No. 3,874,530, issued Apr. 1, 1975, to Purdy, also discloses loading vehicle structure pertinent to the present invention, while U.S. Pat. Nos: 2,296,014; 2,834,451; 3,342,355; 3,638,816; and 3,717,272 also discloses structural features of interest with respect to the present invention.

SUMMARY OF THE INVENTION

It is an object of the present invention to provide an agricultural airplane loading device which allows an aircraft to be loaded without the loader actually contacting the aircraft.

It is another object of the present invention to provide an agricultural airplane loading device which may be towed behind a conventional vehicle without obstructing the tail lights of the vehicle, thereby eliminating the necessity of tail lights on the loading device itself.

It is another object of the present invention to provide an agricultural airplane loading device having an operating control mechanism arranged for actuation by an operator from the side or rear of the loading device.

It is still another object of the present invention to provide an agricultural airplane loading device provided with a screen for removing and crushing lumps in the material being loaded during the loading operation.

It is still further object of the present invention to provide an agricultural airplane loading device having hopper wall extensions which are readily replaceable for containing lumped and coagulated material above the plane of a screen associated with the hopper.

It is yet another object of the present invention to provide a loading device having an eccentric rotating mass on the driving pulley of an auger conveyor for vibrating and settling materials within the hopper associated with and feeding material to the conveyor.

These and other objects are achieved according to the present invention by provided an agricultural airplane loading device having: a wheeled frame; a hopper mounted on the frame and provided with a lower portion forming a discharge opening; and a conveyor arranged below the hopper and connected thereto for receiving material from the discharge opening of the hopper and elevating the material to a reservoir of an airplane.

The loading device advantageously further includes a gate arrangement disposed between the conveyor and the discharge opening of the hopper for controlling flow of material from the hopper to the conveyor. This gate arrangement preferably includes a sliding gate element and a control mechanism connected to the gate element for actuating it. The control mechanism includes a pair of handles arranged for permitting the rate of flow of material from the hopper to the conveyor to be controllable from different positions relative to the frame of the loading device.

The conveyor preferably includes a longitudinally extending housing having an inlet disposed beneath and connected to the discharge opening of the hopper, and an outlet disposed above the inlet opening. The housing advantageously extends substantially 45° from the frame and transverse or laterally of the frame substantially 17½ degrees with respect to a horizontal plane such as the apron surface, and the like, on which the loading device is resting, in order to permit the conveyor to discharge the material into the reservoir of an airplane without actually contacting the airplane.

The conveyor also preferably includes an auger disposed in the housing and having connected thereto as by a suitable belt a drive assembly mounted on the frame and including a pulley affixed to the auger for rotating same. A mass is arranged eccentrically on the pulley for vibrating the hopper when the conveyor is in operation and preventing bridging and tunnelling of material in the hopper as same passes to the discharge opening and into the housing of the conveyor.

The hopper is advantageously provided with a screen disposed over an inlet opening thereof, with a removable rim being arranged about the upper edge of the hopper around the inlet opening so as to form a side wall extending above the plane of the screen in order to store lumped and coagulated material above the screen. The screen itself being arranged for reducing the size of the lumps prior to their being fed to the conveyor.

The frame of the loading device is advantageously constructed of a width narrower than a vehicle, such as a pickup truck which tows the device for permitting the tail lights of the vehicle to be visible beyond the frame at the rear of the vehicle so as to permit towing of the loading device without the inclusion thereon of tail lights or similar safety appliances.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an exploded, schematic, perspective view showing an agricultural airplane loading device according to the present invention.

FIG. 4 is an enlarged, fragmentary, schematic, sectional view taken generally along the line 4—4 of FIG. 3.

FIG. 5 is a fragmentary, schematic, detail view taken generally along the line 5—5 of FIG. 2 but reversed from the orientation shown in FIG. 2.

DESCRIPTION OF THE PREFERRED EMBODIMENTS

Figure 2:
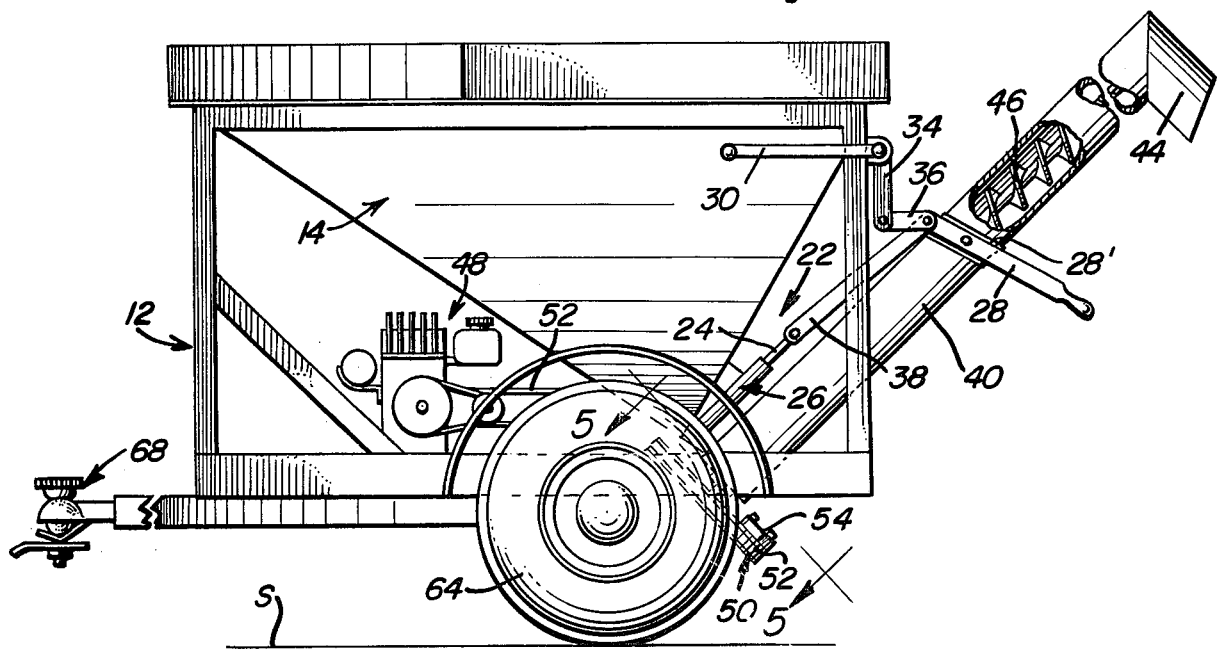
FIG. 2 is an enlarged, fragmentary, schematic, side elevational view, partly cut away and in section, showing the loading device of FIG. 1.
Figure 3:
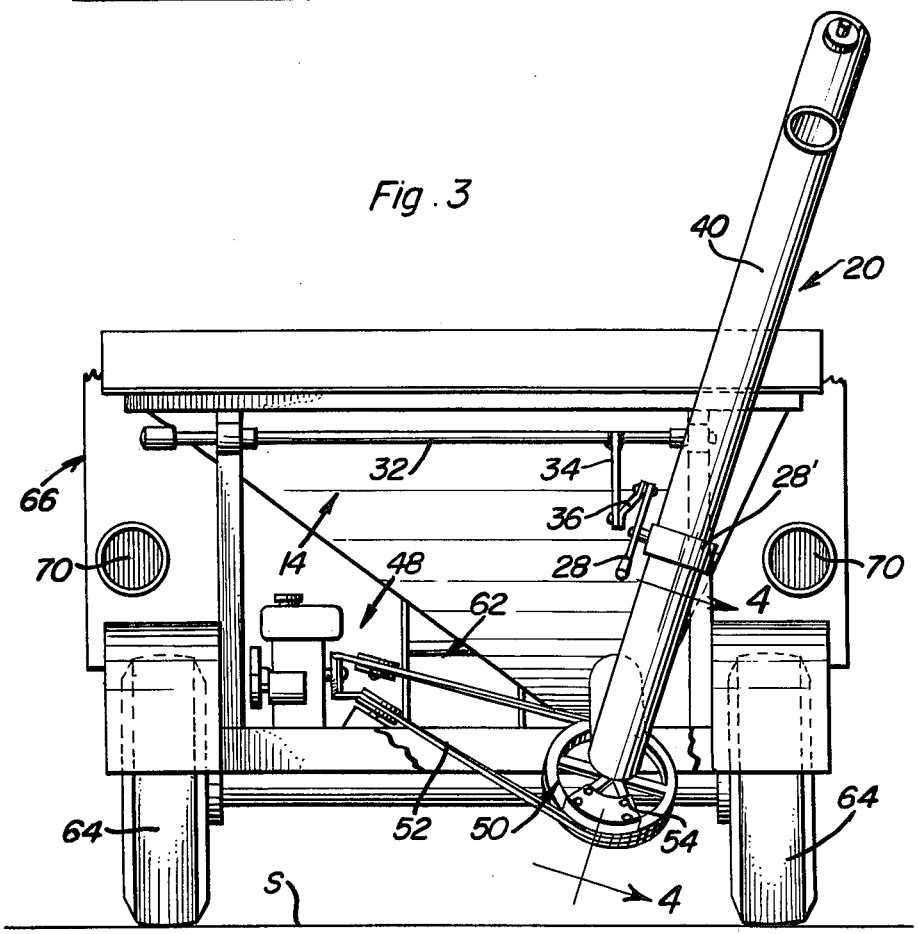
FIG. 3 is a fragmentary, schematic, rear end view, looking from the right in FIG. 3, showing the loading device of FIGS. 1 and 2 being towed behind a suitable vehicle.

Referring now more particularly to FIGS. 1 through 3 of the drawings, an agricultural airplane loading device 10 according to the present invention includes a generally rectangular wheeled frame 12, having four corners, on which is mounted a hopper 14 in such a manner as to be suspended from an upper portion thereof, with the hopper 14 terminating at the lower portion 16 thereof in a discharge opening 18 arranged adjacent a corner of the frame 12. A conveyor assembly 20 is arranged below hopper 14 and connected to lower portion 16 thereof for receiving material from discharge opening 18 and elevating the material to a reservoir (not shown) of a conventional agricultural airplane (not shown), and the like. Although the aircraft is not shown in the drawings, it will be understood that such aircraft are well known and commonly employed for crop dusting and similar purposes. Further, the material employed with the device 10 is primarily intended to be appropriate agricultural chemicals, such as seed, prilled fertilizer, and the like.

Device 10 further includes a gate assembly 22 arranged between the conveyor assembly 20 and the discharge opening 18 of hopper 14 for controlling flow of material from hopper 14 to conveyor assembly 20. This gate assembly 22 includes a sliding gate element 24 (FIG. 4) disposed in an appropriate guide arrangement 26 and actuated by a mechanism pivotally connected to one end of element 24 for actuating it by appropriate manipulation of one of a pair of handles 28 and 30 located at the rear end and one side, respectively, of frame 12. The control mechanism also includes a rotatably mounted bar 32 extending along the rear end of frame 12 adjacent the top thereof, and having affixed thereto a link 34 which is pivotally connected to a link 36, also pivotally connected to the handle 28 and pivotally connected to a link 38, which is the portion of the mechanism pivotally connected to gate element 24. It will be appreciated that handle 28 is pivotally connected to a collar portion 28' grippingly engaged on conveyor assembly 20 for providing a pivot fulcrum for handle 28.

As will be appreciated, movement of either handle 28 or 30 will cause link 38 to reciprocate generally in the plane of the guide 26 which slidably receives gate element 24, and thus cause gate element 24 to slide within its associated guide 26 and vary the amount of the discharge opening 18 which is unblocked at any given time so as to effectively control the amount of material passing through discharge opening 18 from hopper 14 into the conveyor assembly 20.

Conveyor assembly 20 includes a longitudinally extending substantially tubular housing 40 having an inlet 42 disposed beneath and in communication with discharge opening 18 of hopper 14, and an outlet 44 discharge opening above the inlet 42, or at the longitudinally spaced end of housing 40 from inlet 42, so as to be arrangeable adjacent the filler opening (not shown) of an aircraft reservoir to be filled. Housing 40 extends substantially 45° from frame 12 and transverse or laterally to frame 12 substantially 17½°, both angles being taken with respect to a horizontal plane such as the supporting surface S. This orientation of the longitudinally extending housing 40 permits the outlet 44 of housing 40 to be arranged adjacent the filler opening of a reservoir to be filled in such a manner that the associated aircraft need not be contacted by the conveyor assembly 20 or any other part of the loading device 10, and thus avoids possible damage to the aircraft being loaded.

While the length of housing 40 will vary for aircraft of different heights above the surface S, such heights are fairly standard for agricultural aircraft. In any event, the aforementioned angular relationships of housing 40 are found to effectively prevent contact of loading device 10 with an aircraft being loaded for various kinds of agricultural airplanes.

Conveyor assembly 20 includes an auger 46 rotatably disposed or journaled in housing 40 and selectively rotated by a drive assembly 48 mounted on frame 12 and including a pulley 50 affixed to the shaft portion of auger 46 for rotating same. A belt 52 extending between the, for example, gasoline engine partially forming drive assembly 48 is guided by suitable guide pulleys so as to wrap around at least one half of the periphery of pulley 50. A mass (FIG. 5), which may be a lead weight, and the like, is eccentrically on pulley 50, or adjacent a portion of the outer periphery of pulley 50, for vibrating hopper 14 when the conveyor assembly 20 is in operation and preventing bridging and tunnelling of material in hopper 14. It will be appreciated that since hopper 14 is suspended from the upper section of frame 12, the lower portion 16 of hopper 14 is effectively suspended and in a position to vibrate under the force applied thereto by the eccentrically disposed mass 54 when pulley 50 is being rotated by movement of belt 52.

Hopper 14 is provided with a screen 56 disposed thereon adjacent the upper portion, or adjacent the upper rails of frame 12, for reducing the size of lump and coagulated material fed onto screen 56 from a suitable source of material, such as a bin (not shown) or suitable truck (not shown). A rim 58 is removably arranged on the upper edge of hopper 14 so as to provide a side wall extending above the screen 56 and permits storage of lump and coagulated material above the screen 56 such that the screen 56 will have sufficient time to function in a manner of a sieve and reduce the size of the lumps of material discharged on screen 56 during a loading operation. The rim 58 is removably mounted in a suitable manner, known per se, such that the height of the rim can be readily varied by substitution of one rim for another of a different height, and to facilitate replacing of rim 58 should any portion thereof become damaged due to the discharge of material into hopper 14.

Screen 56 is associated rim 58 are shaped as can best be seen in FIG. 1 so as to provide on the upper surface of frame 12 space for a platform 60 which permits an operator (not shown) to perform duties as necessary from the upper portion of device 10. This platform 60 can be reached as by a suitable ladder 62 provided on the front end of frame 12.

Frame 12, which is provided with suitable wheels 64 in a conventional manner for movement over a support surface S, is constructed of a width narrower than a conventional vehicle 66 to which frame 12 can be attached for towing as by a conventional hitch 68. By this arrangement, the tail lights 70 of vehicle 66 are visable beyond frame 12 from the rear of vehicle 66 so that the device 10 can be towed behind vehicle 66 which may be a conventional pickup truck, and the like, without the necessity of providing device 10 with tail lights, and the like.

In operation, hitch 68 is connected to the, for example, rear bumper (not shown) of a towing vehicle 66 when it is desired to transport the loading device 10 from one work area to another. Once the loading device 10 is in a work area where an aircraft is to be loaded, hitch 68 is disconnected from vehicle 66 and is connected to the front bumper (not shown) of the same vehicle 66 so as to stabilize the loading device 10. Screen 56 is placed on top of hopper 14 and material is now loaded into hopper 14 through screen 56. The latter will remove foreign matter and lumps from the material.

The towing vehicle 66 now positions the loading device 10 so that the spout or outlet 44 of conveyor assembly 20 is above the receptacle of an airplane to be loaded. The sliding gate element 24 is now opened by actuation of a handle 28, 30, and the prime mover of drive assembly 48 is started so as to cause the auger 46 to transfer material from hopper 14 to the airplane. The position of gate element 24 will determine the rate of flow of material to the reservoir of the aircraft, while provision of the eccentrically disposed mass 54 will assure proper flow of material from hopper 14 to auger 46.

As can be readily understood from the above description and from the drawings, a loading device according to the present invention provides a simple yet reliable and efficient arrangement for loading aircraft without risking damage to the aircraft and while minimizing inconvenience which usually occurs due to geographical distance between aircraft to be loaded.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scopt of the invention.

What is claimed as new is as follows:

1. An agricultural airplane loading device, comprising, in combination:
    (a) a rectangular, wheeled frame having four corners disposed in a common plane of the frame;
    (b) a hopper mounted on the frame and provided with a lower portion forming a discharge opening arranged adjacent a corner of the frame and adjacent the plane of the frame;
    (c) conveyor means arranged below the hopper for receiving material from the discharge opening of the hopper and elevating the material above the hopper to a reservoir of an airplane being loaded, the conveyor means including a longitudinally extending housing having an inlet disposed beneath the discharge opening of the hopper and an outlet disposed above the inlet for discharging material to the reservoir of an airplane being loaded, the housing extending upwardly at an angle of substantially 45° from the frame and transverse to the frame substantially at an angle $17\frac{1}{2}°$, both angles being taken relative to a horizontal plane; and
    (d) gate means arranged between the conveyor means and the discharge opening of the hopper for controlling flow of material from the hopper to the conveyor means, the gate means including a sliding gate element, and a control mechanism connected to the gate element for actuating same, the mechanism including a pair of handles arranged for permitting the rate of flow of material through the gate means to be controlled from different positions relative to the frame of the loading device, the conveyor means further including an auger disposed on the housing, and drive means mounted on the frame and including a pulley affixed to the auger for rotating same, a mass arranged eccentrically on the pulley for vibrating the hopper when the conveyor means is in operation and preventing bridging and tunnelling of material in the hopper; the hopper being provided with a screen arranged for forming a sieve which reduces the size of lumped and coagulated material discharged on the screen, and a rim disposed around the periphery of the screen for forming side walls extending above a plane of the screen and storing the lumped and coagulated material on the screen in order to provide the screen with sufficient time in order to reduce the size of the lumped and coagulated material, the frame being constructed of a width narrower than a vehicle towing the device for permitting tail lights of the towing vehicle to be visible beyond the frame from the rear of the vehicle.

* * * * *